United States Patent [19]

Danielson et al.

[11] Patent Number: 4,607,016

[45] Date of Patent: Aug. 19, 1986

[54] GLASS FOR USE AS TUNGSTEN-HALOGEN LAMP ENVELOPES

[75] Inventors: Paul S. Danielson; Lloyd G. Young, both of Corning, N.Y.

[73] Assignee: Corning Glass Works, Corning, N.Y.

[21] Appl. No.: 742,430

[22] Filed: Jun. 7, 1985

[51] Int. Cl.$^4$ ............................................. C03C 3/087
[52] U.S. Cl. ................................................... 501/70
[58] Field of Search ............................................ 501/70

[56] References Cited

U.S. PATENT DOCUMENTS 4,302,250 11/1981 Danielson et al. ................... 501/70

Primary Examiner—Mark L. Bell
Attorney, Agent, or Firm—C. S. Janes, Jr.

[57] ABSTRACT

This invention is concerned with a narrowly-defined composition area of glasses in the alkaline earth aluminosilicate system especially suitable for fabricating tungsten-halogen lamp envelopes. The invention comprises the use of arsenic in the batch in such amounts as to yield about 0.17–0.3% by weight as analyzed in the glass as a secondary fining agent to insure a seed count no greater than 10/in$^3$. The base glass compositions consist essentially, in weight percent, of about:

| $SiO_2$ | 64–68 | BaO | 0–5 |
|---|---|---|---|
| CaO | 11–14 | SrO | 0–4 |
| $Al_2O_3$ | 16.5–18.5 | BaO + SrO | 2–6.5 |

2 Claims, No Drawings

GLASS FOR USE AS TUNGSTEN-HALOGEN LAMP ENVELOPES

BACKGROUND OF THE INVENTION

U.S. Pat. No. 4,302,250 provides a discussion of tungsten-halogen lamps and their advantage with respect to conventional incandescent lamps. The patent also describes the high temperature parameters under which such lamps operate and the extensive research undertaken to develop glasses demonstrating melting and forming capabilities suitable for mass producing lamp envelopes, as well as exhibiting the physical properties demanded for that application. As illustrative of that prior research, the patent cited U.S. Pat. Nos. 3,496,401, 3,978,362, 4,060,423, and 4,255,198, and noted that, whereas the alkaline earth aluminosilicate glasses disclosed in each of those patents had been fabricated into envelopes for tungsten-halogen lamps, none displayed optimal behavior for that utility either with respect to manufacturing capability or in terms of physical properties.

U.S. Pat. No. 4,302,250 is directed to glasses having melting and forming characteristics suitable for making glass tubing from which envelopes for tungsten-halogen lamps can be fabricated and which can be sealed to molybdenum metal, coupled with the physiochemical properties required in a glass exposed to the operating conditions of a tungsten-halogen lamp. Thus, the glasses of the patent were designed to exhibit a strain point higher than 750° C., a coefficent of thermal expansion (0°–300° C.) between $42-44\times10^{-7}/°C.$, a liquidus temperature below 1300° C., a viscosity at the liquidus of at least 40,000 poises, and a viscosity of less than 1000 poises at temperatures no higher than 1520° C. Glasses manifesting those properties were prepared from the following straitly-defined ranges of components, expressed in terms of weight percent on the oxide basis:

| $SiO_2$ | 64–68 | BaO | 0–5 |
|---|---|---|---|
| CaO | 11–14 | SrO | 0–4 |
| $Al_2O_3$ | 16.5–18.5 | BaO + SrO | 2–6.5 |

In the most preferred glasses, both BaO and SrO will be present in a combined amount of at least 3% and in a molar ratio SrO:BaO ranging from about 2:1 to 1:2.

The exceptionally high strain points exhibited by the glasses of that patent are particularly advantageous in enabling lamp operation at temperatures more elevated than possible with the prior art alkaline earth aluminosilicate glasses. Unfortunately, however, the same high temperature capabilities which render those materials extremely attractive for lamp envelope applications also led to manufacturing problems. Specifically, tubing commercially produced therefrom contained an economically unacceptable level of seeds, despite the inclusion of a combined chloride/sulfate fining agent. Thus, alkaline earth aluminosilicate glasses such as are disclosed in that patent (and in the prior art patents discussed therein) have conventionally relied upon the use of chloride and/or sulfate for fining.

As is explained in Pat. No. 4,302,250, the lamp envelopes are fashioned from glass tubing and lead wires of molybdenum metal are sealed into the envelope. Both of these operations require lampworking. Hence, a glass destined to be lampworked must be thermally stable; i.e., it should not be immoderately subject to devitrification, oxidation reboil, and/or deleterious reduction phenomena. Furthermore, the glass ingredients must not chemically react with the halogen atmosphere within the lamp envelope during lamp operation. The use of chloride and/or sulfate for fining the glass has satisfied the above criteria but, as has been noted above, those components have not proved successful in reducing the seed count of tubing prepared from glasses of Pat. No. 4,302,250 to a commercially-acceptable level.

Accordingly, the objective of the present invention was to devise means for improving the fining of such glasses while satisfying the other cited requirements.

SUMMARY OF THE INVENTION

We have found that objective can be obtained by including a critically defined amount of arsenic as a fining agent in the glass compositions disclosed in Pat. No. 4,302,250. Thus, our invention comprises incorporating arsenic, as analyzed in the final glass in terms of $As_2O_3$, at a level of at least 0.17%, but not more than 0.30%, in glass compositions consisting essentially, expressed in terms of weight percent on the oxide basis, of about

| $SiO_2$ | 64–68 | BaO | 0–5 |
|---|---|---|---|
| CaO | 11–14 | SrO | 0–4 |
| $Al_2O_3$ | 16.5–18.5 | BaO + SrO | 2–6.5 |

In the most preferred glasses, both BaO and SrO will be present in a combined amount of at least 3% and in a molar ratio SrO:BaO ranging from about 2:1 to 1:2.

Arsenic is well-known in the glass art as a fining agent. However, it has not generally been employed in applications where lampworking is involved because of the hazard of darkening resulting from reduction of the arsenic. Moreover, in contrast to the essential total elimination of chloride and/or sulfate during melting of the glass, a substantial proportion of arsenic in various forms remains in the glass. Accordingly, poisoning of the halogen cycle of the operating lamp is hazarded. Therefore, an investigation was initiated to determine whether a composition interval of arsenic could be defined sufficient to satisfactorily fine the glass, but not so much as to cause darkening of the glass during lampworking and/or cause poisoning of the halogen cycle.

DESCRIPTION OF PREFERRED EMBODIMENTS

A batch was compounded for a glass having the following base composition consisting essentially, expressed in terms of parts by weight on the oxide basis, of about

| $SiO_2$ | 66.0 | BaO | 3.5 |
|---|---|---|---|
| $Al_2O_3$ | 16.0 | SrO | 1.5 |
| CaO | 13.0 | | |

As was noted above, sulfate fining is commercially practiced with alkaline earth aluminosilicate glass compositions. Accordingly, $CaSO_4$ comprised one batch constituent in a conventional amount of about 17% by weight to provide sulfate fining. That content of $CaSO_4$ supplies an equivalent CaO level of about 7% by weight. Whereas the total absence of seeds would self-evidently comprise the ideal condition, the industry specification permits the presence of up to 10 seeds/in³. Unfortunately, even the use of the above large level of sulfate has not insured a seed count of less than 10 seeds/in$^3$. Larger additions have been explored but with little success. This factor, plus the obvious hazard of increased air pollution resulting from the volatilization of SO$_2$ and SO$_3$, have militated against sulfate concentrations greater than that equivalent to about 20% CaSO$_4$.

The batch was charged into a large commercial continuous glass melting tank and varying levels of arsenic in the form of As$_2$O$_5$ were added to the batch during the melting campaign. Tubing was drawn utilizing the conventional Vello process, a chemical analysis of arsenic content in the tubing in terms of As$_2$O$_3$ being performed daily, and an average daily seed count in the tubing determined.

Over a 12-day operation of the glass melting tank, arsenic analyses as As$_2$O$_3$ varied from a minimum of about 0.15% by weight through a maximum of about 0.34% and then returned to approximately 0.22% at the close of the exercise. At the concentration of 0.15% As$_2$O$_3$, the seed count averaged in the neighborhood of 30/in$^3$. At 0.18% as As$_2$O$_3$ the count fell to about 5 seeds/in$^3$ and moved even lower with higher As$_2$O$_3$ contents. However, the occurrence of glass darkening during lampworking becomes a serious hazard at As$_2$O$_3$ levels much above 0.3%. Accordingly, an analyzed concentration of about 0.3% As$_2$O$_3$ has been deemed to constitute a practical maximum, with about 0.17% being considered a practical minimum.

As will be appreciated, the inclusion of arsenic in the batch permits the industry specification seed count of no more than 10/in$^3$ to be achieved with lower sulfate contents, particularly at analysed As$_2$O$_3$ levels of 0.2% and greater. Nevertheless, the desirability of maintaining a very low presence of seeds has cautioned against reducing the sulfate content below that equivalent to about 5 % CaSO$_4$.

We claim:

1. A glass suitable as an envelope for a tungsten-halogen lamp and for sealing to molybdenum metal, said glass exhibiting a seed level no more than 10/in$^3$, a strain point higher than 750° C., a coefficient of thermal expansion (0°–300° C.) between 42–44×10$^{-7}$/°C., a liquidus temperature below 1300° C., a viscosity at the liquidus of at least 40,000 poises, a viscosity of less than 1000 poises at temperatures no higher than 1520° C., and having a base composition consisting essentially, expressed in terms of weight percent on the oxide bases as calculated from the batch, of about 64–68% SiO$_2$, 11–14% CaO, 16.5–18.5% Al$_2$O$_3$, 2–6.5% BaO+SrO, consisting of 0–4% SrO and 0–5% BaO, an amount of sulfate at least equivalent to 5% CaSO$_4$, but not more than about 20% CaSO$_4$, and containing arsenic as analyzed in the glass in terms of As$_2$O$_3$ of about 0.17–0.3% As$_2$O$_3$.

2. A glass according to claim 1 wherein said base composition contains 3–6.5% BaO+SrO, consisting of 0–4% SrO and 0–5% in a molar ratio SrO:BaO ranging from 2:1–1:2, and contains arsenic as analyzed in the glass in terms of As$_2$O$_3$ of about 0.2–0.3% As$_2$O$_3$.

* * * * *